United States Patent
Raveendran et al.

(10) Patent No.: US 9,521,411 B2
(45) Date of Patent: Dec. 13, 2016

(54) METHOD AND APPARATUS FOR ENCODER ASSISTED-FRAME RATE UP CONVERSION (EA-FRUC) FOR VIDEO COMPRESSION

(71) Applicant: QUALCOMM Incorporated, San Diego, CA (US)

(72) Inventors: Vijayalakshmi R. Raveendran, San Diego, CA (US); Fang Shi, San Diego, CA (US); Gordon Kent Walker, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 614 days.

(21) Appl. No.: 13/760,991

(22) Filed: Feb. 6, 2013

(65) Prior Publication Data
US 2013/0188742 A1    Jul. 25, 2013

Related U.S. Application Data

(62) Division of application No. 11/186,454, filed on Jul. 20, 2005, now Pat. No. 8,374,246.
(Continued)

(51) Int. Cl.
H04N 7/12    (2006.01)
H04N 19/85   (2014.01)
(Continued)

(52) U.S. Cl.
CPC ...... H04N 19/00903 (2013.01); H04N 19/132 (2014.11); H04N 19/137 (2014.11);
(Continued)

(58) Field of Classification Search
USPC ........................... 375/E7.19, E7.254, 240.16, 240.23,375/240.15; 382/236, 239, 300, 382/233, 232
See application file for complete search history.

(56) References Cited

U.S. PATENT DOCUMENTS 3,670,096 A    6/1972   Candy et al.
5,168,394 A    12/1992  Sasho
(Continued)

FOREIGN PATENT DOCUMENTS

CL    07862007        11/2007
EP    0018856 A1      11/1980
(Continued)

OTHER PUBLICATIONS

Wiegand T., "H.26L Test Model Long-Term No. 9 (TML-9) draft0", ITU—Telecommunications Standardization Sector Study Group 16 Video Coding Experts Group (VCEG), Document VCEG-N83 d1, 2001.
(Continued)

*Primary Examiner* — Gims Philippe
(74) *Attorney, Agent, or Firm* — Norton Rose Fulbright US LLP

(57) ABSTRACT

An Encoder Assisted Frame Rate Up Conversion (EA-FRUC) system that utilizes video coding and pre-processing operations at the video encoder to exploit the FRUC processing that will occur in the decoder in order to improve compression efficiency and reconstructed video quality is disclosed. One operation of the EA-FRUC system involves determining whether to encode a frame in a sequence of frames of a video content by determining a spatial activity in a frame of the sequence of frames; determining a temporal activity in the frame; determining a spatio-temporal activity in the frame based on the determined spatial activity and the determined temporal activity; determining a level of a redundancy in the source frame based on at least one of the determined spatial activity, the determined temporal activity,
(Continued)

and the determined spatio-temporal activity; and, encoding the non-redundant information in the frame if the determined redundancy is within predetermined thresholds.

27 Claims, 5 Drawing Sheets

Related U.S. Application Data

(60) Provisional application No. 60/589,901, filed on Jul. 20, 2004.

(51) Int. Cl.
| | | |
|---|---|---|
| *H04N 19/139* | (2014.01) | |
| *H04N 19/176* | (2014.01) | |
| *H04N 19/172* | (2014.01) | |
| *H04N 19/46* | (2014.01) | |
| *H04N 19/15* | (2014.01) | |
| *H04N 19/61* | (2014.01) | |
| *H04N 19/132* | (2014.01) | |
| *H04N 19/14* | (2014.01) | |
| *H04N 19/137* | (2014.01) | |
| *H04N 19/142* | (2014.01) | |
| *H04N 19/194* | (2014.01) | |
| *H04N 19/587* | (2014.01) | |
| *H04N 19/583* | (2014.01) | |

(52) U.S. Cl.
CPC .......... *H04N 19/139* (2014.11); *H04N 19/14* (2014.11); *H04N 19/142* (2014.11); *H04N 19/15* (2014.11); *H04N 19/172* (2014.11); *H04N 19/176* (2014.11); *H04N 19/194* (2014.11); *H04N 19/46* (2014.11); *H04N 19/583* (2014.11); *H04N 19/587* (2014.11); *H04N 19/61* (2014.11); *H04N 19/85* (2014.11)

(56) References Cited

U.S. PATENT DOCUMENTS

| | | | |
|---|---|---|---|
| 5,198,902 A | 3/1993 | Richards et al. | |
| 5,387,947 A | 2/1995 | Shin | |
| 5,394,196 A | 2/1995 | Robert | |
| 5,784,107 A | 7/1998 | Takahashi | |
| 5,844,616 A | 12/1998 | Collet et al. | |
| 5,995,154 A | 11/1999 | Heimburger | |
| 6,008,865 A | 12/1999 | Fogel | |
| 6,043,846 A | 3/2000 | Shen et al. | |
| 6,101,220 A | 8/2000 | Ando | |
| 6,192,079 B1 | 2/2001 | Sharma et al. | |
| 6,208,760 B1 | 3/2001 | De Haan et al. | |
| 6,229,570 B1 | 5/2001 | Bugwadia et al. | |
| 6,229,925 B1 | 5/2001 | Alexandre et al. | |
| 6,330,535 B1 | 12/2001 | Yasunaga et al. | |
| 6,345,247 B1 | 2/2002 | Yasunaga et al. | |
| 6,404,901 B1 | 6/2002 | Itokawa | |
| 6,424,676 B1 | 7/2002 | Kono et al. | |
| 6,438,275 B1* | 8/2002 | Martins et al. ............... 382/300 |
| 6,480,541 B1 | 11/2002 | Girod et al. | |
| 6,539,120 B1* | 3/2003 | Sita et al. ..................... 382/233 |
| 6,560,371 B1 | 5/2003 | Song et al. | |
| 6,597,738 B1 | 7/2003 | Park et al. | |
| 6,618,439 B1 | 9/2003 | Kuo et al. | |
| 6,625,333 B1 | 9/2003 | Wang et al. | |
| 6,654,420 B1 | 11/2003 | Snook | |
| 6,704,357 B1 | 3/2004 | Ketcham | |
| 6,728,317 B1 | 4/2004 | Demos | |
| 7,003,038 B2 | 2/2006 | Divakaran et al. | |
| 7,042,941 B1 | 5/2006 | Laksono et al. | |
| 7,075,986 B2 | 7/2006 | Girod et al. | |
| 7,116,716 B2 | 10/2006 | Ma et al. | |
| 7,215,710 B2 | 5/2007 | Yamada et al. | |
| 7,280,708 B2 | 10/2007 | Song et al. | |
| 7,343,044 B2 | 3/2008 | Baba et al. | |
| 7,366,462 B2 | 4/2008 | Murali et al. | |
| 7,386,049 B2* | 6/2008 | Garrido et al. .......... 375/240.15 |
| 7,457,471 B2* | 11/2008 | Song et al. .................... 382/236 |
| 7,577,196 B2 | 8/2009 | Ducloux et al. | |
| 8,369,405 B2 | 2/2013 | Shi et al. | |
| 8,374,246 B2 | 2/2013 | Raveendran et al. | |
| 2004/0017852 A1 | 1/2004 | Garrido et al. | |
| 2005/0005301 A1 | 1/2005 | Song et al. | |
| 2005/0058205 A1* | 3/2005 | Holcomb et al. ........ 375/240.23 |
| 2006/0002465 A1 | 1/2006 | Raveendran et al. | |
| 2006/0018383 A1 | 1/2006 | Shi et al. | |
| 2006/0039476 A1 | 2/2006 | Watanabe | |
| 2006/0159359 A1 | 7/2006 | Lee | |
| 2006/0165176 A1 | 7/2006 | Raveendran et al. | |
| 2006/0262979 A1* | 11/2006 | Srinivasan et al. ........... 382/232 |
| 2007/0064800 A1 | 3/2007 | Ha | |
| 2007/0074266 A1 | 3/2007 | Raveendran et al. | |
| 2007/0177667 A1 | 8/2007 | Subramania et al. | |
| 2007/0230563 A1 | 10/2007 | Tian et al. | |
| 2007/0230564 A1 | 10/2007 | Chen et al. | |
| 2007/0230578 A1 | 10/2007 | Shi et al. | |
| 2008/0002862 A1 | 1/2008 | Matsugu et al. | |
| 2008/0112606 A1 | 5/2008 | Lee et al. | |

FOREIGN PATENT DOCUMENTS

| | | |
|---|---|---|
| EP | 0782343 A2 | 7/1997 |
| EP | 0881836 A1 | 12/1998 |
| EP | 0883298 A2 | 12/1998 |
| EP | 1287492 A2 | 3/2003 |
| EP | 1357750 A2 | 10/2003 |
| EP | 1369820 | 12/2003 |
| EP | 1383322 | 1/2004 |
| EP | 1481546 A1 | 12/2004 |
| EP | 1617678 A2 | 1/2006 |
| GB | 2316568 A | 2/1998 |
| JP | 08191448 | 7/1996 |
| JP | 08223536 | 8/1996 |
| JP | 8256340 A | 10/1996 |
| JP | 10066033 A | 3/1998 |
| JP | 11112940 A | 4/1999 |
| JP | 11177940 A | 7/1999 |
| JP | H11510937 A | 9/1999 |
| JP | 2000134585 A | 5/2000 |
| JP | 2000512091 | 9/2000 |
| JP | 2003515987 T | 5/2003 |
| JP | 2003274415 A | 9/2003 |
| JP | 2003348596 A | 12/2003 |
| JP | 2004112229 A | 4/2004 |
| JP | 2004166183 A | 6/2004 |
| JP | 2005526457 A | 9/2005 |
| JP | 2008526119 A | 7/2008 |
| KR | 019990204104 | 11/1999 |
| KR | 20030073254 A | 9/2003 |
| RU | 2182727 | 5/2002 |
| RU | 2201654 | 3/2003 |
| TW | 480885 B | 3/2002 |
| WO | 9216071 | 9/1992 |
| WO | 9728507 A1 | 8/1997 |
| WO | 9746020 A2 | 12/1997 |
| WO | 9746022 A2 | 12/1997 |
| WO | 9922525 A1 | 5/1999 |
| WO | 0133864 A1 | 5/2001 |
| WO | 2004025965 A1 | 3/2004 |
| WO | WO-2005043310 A2 | 5/2005 |
| WO | WO-2005079070 A1 | 8/2005 |

OTHER PUBLICATIONS

A. Kaup et al.: "Efficient prediction of uncovered background in inter-frame coding using spatial extrapolation" in Proc. ICASSP, vol. 5, pp. 501-504, 1994.

Advanced Video Coding for Generic Audiovisual Services, ITU-T Standard Pre-Published (P), International Telecommunication Union, Geneva, N. H264 3/5, Mar. 1, 2005, XP002448756.

(56) References Cited

OTHER PUBLICATIONS

A.M. Tekalp, "Digital Video Processing", Oppenheim, ed, Prentice Hall Signal Processing Series, Upper Saddle River, NJ 1995.
Bruijn F.J., et al., "Efficient video coding integrating MPEG-2 and picture-rate conversion," IEEE Transactions on Consumer Electronics, IEEE Service Center, 2002, 48 (3), 688-693.
Castagno et al., "A Method for Motion Adaptive Frame Rate Up-Conversion," IEEE Transactions on Circuits and Systems for Video Technology, IEEE Service Center, Piscataway, NJ, USA, vol. 6, No. 5,Oct. 1996, pp. 436-445, XP000627032.
Chen, Tao, "Adaptive Temporal Inerpolation Using Bidirectional Motion Estimation and Compensation," Institute of Electrical and Electronics Engineers: Proceedings 21002 International Conference on Image Processing, ICIP, Rochester, NY, Sep. 22-25, 2002, IEEE, US, vol. 2 or 3, pp. 313-316, XP010607971.
Dane G., et al., "Encoder-Assisted Adaptive Video Frame Interpolation," Acoustics, Speech, and Signal Processing, 2005. Proceedings. (ICASSP '05). IEEE International Conference on, Philadelphia, PA, Piscataway, NJ, IEEE, vol. 2, Mar. 18, 2005, pp. 349-352.
European Search Report—EP09162976—Search Authority—Munich—Sep. 7, 2009.
European Search Report—EP10156066—Munich—Apr. 23, 2010.
Flierl et al., "Generalized B Pictures and the Draft H.264/AVC Video-Compresiion Standard", IEEE Trans. Circuit and Systems for Video Technology, vol. 13, No. 7, pp. 587-597, 2003.
"Forward Link Only Air Interface Specification for Terrestrial Mobile Multimedia Multicast: TIA-1099" EIMIA Standards, Telecomm. Industry Assoc., Aug. 1, 2006, XP017005609, Arlington, VA, Secs. 5.2.1.2.9.2.7, 5.2.1.2.9.2.8, 5.2.1.2.10.
Fukunaga, et al., "MPEG-4 Video Verification Model Version 160, XP000861688 Section 37," International Organization for Standardization-Organization International de Normalization, 2000, N3312, I-380, 81-88.
G. Dane and T.Q. Nguyen, "Motion vector processing for frame rate up conversion" in IEEE international Conference on Acoustics, Speech, and Signal Processing, pp. 309-312, May 2004.
Gallant et al.: "Efficient scalable DCT-based video coding at low bit rates", Image Processing, 1999. IC 99. International Conference on Kobe, Japan Oct. 24-28, 1999, Piscataway, NJ, USA, IEEE, US, vol. 3, Oct. 24, 1999 (Oct. 24, 1999), pp. 782-786, XP010368741.
Ghandi M. et al., Layered H.264 Video Transmission with Hierarchical QAM [Online] May 1, 2005, pp. 1-17, xp002446009, URL:http//mahdi/ghandi.ws/papers/jvcir06.
Hur J.H., et al.,"H. 264 to MPEG-4 Transcoding Using Block Type Information," Proceedings of the 2005 IEEE Region 10 Conference (TENCON 2005), 2005, pp. 1-6, ISBN: 0-7803-9311-2.
Inazumi, et al., "Estimation of the Optimal Frame Rate for Video Communications Under Bit-Rate Constraints, Scripta Technica, New York, USA,Part I, XP001171954," Electronics & Communications in Japan Part I—Communications, 2003, 86 (12), 54-67.
International Search Report and Written Opinion—PCT/US05/25813, International Search Authority—European Patent Office—Feb. 16, 2006.
Kikuchi Y., et. al., "Improved multiple frame motion compensation using frame interpolation", Joint Video Team(JVT) of ISO/IEC MPEG & ITU-TVCEG (ISO/IEC JTC1/ SC29/WG11 and ITU-T SG16 Q.6), Document: JVT-B075, Jan. 29-Feb. 1, 2002, [online] Jan. 17, 2005, <URL:http://wftp3.itu.int/av-arch/jvt-site/2002_01_Geneva/JVT-B075.doc>.
Kim, et al., "A New Video Interpolation Technique Based on Motion-Adaptive Subsampling," This work was supported by Jeoju University, Korea, IEEE Transactions on Consumer Electronics, IEEE Service Center, Aug. 1, 1999, pp. 782-787, vol. 45 (3), New York, U.S. LNKD-DOI:10.1109/30.793602, XP011083800.
Lee S-H., et al., "Weighted-Adaptive Motion-Compensated Frame Rate Up-Conversion," IEEE Transactions on Consumer Electronics, Aug. 1, 2003 (Aug. 1, 2003), pp. 485-492, vol. 49 (3), IEEE Service Center, New York, NY, US, XP002290775, ISSN: 0098-3063, DOI: 10.1109/TCE.2003.1233759.
Liu et al., " Adaptive Video Multcast over the Internet", IEEE Computer Society, 2003, pp. 22-33.
Liu et al.: "MCI-Embedded Motion-Compensated Prediction for Quality Enhancement of Frame Interpolation", Proceedings of the SPIE—The International Society for Optical Engineering, Multimedia Systems and Applications III, vol. 4209, Nov. 6, 2000, (Nov. 6, 2000), pp. 251-261, XP002351712, Boston, MA, USA, 2001, abstract, Section 1, pp. 251-252, Section 2, pp. 253-254, Section 4, pp. 256-257.
Ono S., et al., "Ubiquitous Technology: High Efficiency Encoding of Dynamic Images—MPEG-4 and H.264 ," Japan, Ohmsha Ltd., Apr. 20, 2005, 1st ed., Nos. 61-63 and 67, pp. 129, ISBN: 4-274-20060-4.
Partial European Search Report—EP09162976—Search Authority—Munich—Jul. 15, 2009.
Puri et al.: "An Interframe Coding Scheme for Packet Video", Proceedings of the SPIE, Belingham, VA, US, vol. 1199, No. Part 3, Nov. 8, 1989 (Nov. 8, 1989), pp. 1610-1619, XP000568683, abstract section 3, p. 1611 Section 5, pp. 1612-1613 with figures 2 and 4.
Puri et al.: "Video Coding with Motion-Compensated Interpolation for CD-ROM Applications", Signal Processing Image Communication, Elsevier Science Publishers, Amsterdam, NL vol. 2, No. 2, Aug. 1, 1990 (Aug. 1, 1990), pp. 127-144, XP000243473 abstract section 4, pp. 130-132.
Pyun et al., "Scene-Adaptive Frame-Layer Rate Control for Low Bit Rate Video,Tokyo, Japan, XP001184530," IEICE Transactions on Fundamentals of Electronics, Communications and Computer Sciences, Institute of Electronics Information and Comm. Eng.,, 2003, E86-A (10), 2618-2622.
R. Thoma et al.: "Motion compensating interpolation considering covered and uncovered background", Signal Processing: Image Compression 1, pp. 191-212, 1989.
Sasai et al.: "B-Picture Coding with Motion-Compensated Frame Rate up Conversion", Proceedings of the SPIE—The International Society for Optical Engineering, Image and Video Communications and Processing 2005, vol. 5685, Jan. 18, 2005 (Jan. 18, 2005), p. 792-800, XP002351713 San Jose, CA, USA, 2005 abstract Sections 3.1 and 3.3.
Sasai et al., "Frame-Rate Up-Conversion Using Reliable Analysis of Transmitted Motion Information ,uebec, Canada, May 17-21, 2004, Piscataway, NJ, USA, IEEE XP010718914," Acoustics,Speech, and Signal Processing, 2004, IEEE International Conference on Montreal, 2004, 5, 257-260.
Schwarz H. et al., "Combined Scalability Support for the Scalable Extension of H.264/AVC," Multimedia and Expo, 2005. ICME 2005. IEEE International Conference on Ansterdam, The Netherlands, Jul. 6, 2006, pp. 446-449, XP010843292.
Schwarz H et al., "MCTF and Scalability Extension of H. 264/AVC," Internet Citation, [Online] Dec. 15, 2004, XP002368924, URL: http://ip.hhi.de/imagecom_G1/savcw/documents/PCS2004.
Sekiguchi S., et al., "Study of Dynamic Network-Adaptive Transcoder," Proceedings of the 66th (2004) National Conference of the Information Processing Society of Japan, The Information Processing Society of Japan, Mar. 9, 2004, vol. 5, pp. 201-204 .
Sulivan et al.: "Rate-Distortion Optimization for Video Compression", IEEE Signal Processing Magazine, IEEE Service Center, Piscataway, NJ, US, vol. 15, No. 6, Nov. 1998 (Nov. 1998), pp. 74-90, XP001064929, Sub-section "Distortion Measures", pp. 78-79 Sub-section "Optimization Techniques", pp. 80-81 Sub-subsection 'Variable Block Sizes, p. 82, paragraph entitled "Case 1", p. 82 Sub-section "Intra/Inter/Skip Mode Decision", pp. 84-85 Sub-section "Comparison to Other Encoding Strategies", p. 87-88.
Sung-Hee Lee et al: "Adaptive motion-compensated interpolation for frame rate up-conversion" IEEE Transactions on Consumer Electronics, vol. 48, No. 3, Aug. 2002, pp. 444-450.
T. Kuo et al.: " Motion-compensated interpolation for low-bit-rage video quality enhancement" in Proc. SPIE Applications of Digital Image Processing, vol. 3460, p. 277-288, 1998.
Taiwan Search Report—TW094124564—TIPO—Jan. 28, 2012.
Telecommunication Standarization Sector of ITU: "Recommendation H.264 Advanced Video Coding for Generic Audiovisual Ser-

(56) References Cited

OTHER PUBLICATIONS vices," ITU-T Recommendations, International Telecommendation Union, Geneva, CH, No. H264, Mar. 2005.

Thomas Wiegand: "Joint Model No. 1, Revision 1 (JM-IRL)", ITU Study Group 16-Video Coding Experts Group, Dec. 3, 200 (Dec. 3, 2001), pp. 1, 3-75, XP001086627 Section 5, pp. 40-44 Appendix I, pp. 50-57.

Wiegand, T. et al: "Rate-Constrained Coder Control and Comparison of Video Coding Standards", IEEE Transactions on Circuits and Systems for Video Technology, IEEE Service Center, Piscataway, NJ, US, vol. 13, No. 7, pp. 688-703, Jul. 2003.

Yoshiritsu Hatori, et al.,. (written by), Digital Image Network, 1st edition, The Institute of Image Information and Television Engineers (edited by), Kabushiki Kaisha Koronasha, Dec. 25, 2002, pp. 22 to 23, ISBN: 4-339-01262-9.

\* cited by examiner

METHOD AND APPARATUS FOR ENCODER ASSISTED-FRAME RATE UP CONVERSION (EA-FRUC) FOR VIDEO COMPRESSION

CROSS-REFERENCE TO RELATED APPLICATIONS

The present application is a divisional of co-pending, commonly assigned, patent application Ser. No. 11/186,454 entitled "METHOD AND APPARATUS FOR ENCODER ASSISTED-FRAME RATE UP CONVERSION (EA-FRUC) FOR VIDEO COMPRESSION," filed Jul. 20, 2005, which itself claims priority to Provisional Application No. 60/589,901 entitled "Encoder Assisted Frame Rate Up Conversion" filed Jul. 20, 2004, all of these applications being assigned to the assignee hereof and hereby expressly incorporated by reference herein.

REFERENCE TO CO-PENDING APPLICATIONS FOR PATENT

The preset application for patent is related the following co-pending patent application Ser. No. 11/173,121, entitled "Method and Apparatus for Using Frame Rate up Conversion Techniques in Scalable Video Coding", filed Jul. 1, 2005, and assigned to the assignee hereof and hereby expressly incorporated by reference herein.

BACKGROUND

Field

The embodiments described herein relates generally to digital video compression and, more particularly, to a method and apparatus for Encoder Assisted-Frame Rate Up Conversion (EA-FRUC) for video compression.

Background

Video formats supporting various frame rates exist today. The following formats are currently the most prevalent, listed in order by their supported frames per second (fps): 24 (film native), 25 (PAL), 30 (typically interlaced video), and 60 (High Definition (HD) e.g. 720p). Although these frame rates are suitable for most applications, to reach the low bandwidth required for mobile handset video communications, frame rates are sometimes dropped to rates as low as 15, 10, 7.5, or 3 fps. Although these low rates allow low end devices with lower computational capabilities to display some video, the resulting video quality suffers from "jerkiness" (i.e., having a slide show effect), rather than being smooth in motion. Also, the frames dropped often do not correctly track the amount of motion in the video. For example, fewer frames should be dropped during "high motion" video content portions such as those occurring in sporting events, while more frames may be dropped during "low-motion" video content segments such as those occurring in talk shows. Video compression needs to be content dependent, and it would be desirable to be able to analyze and incorporate motion and texture characteristics in the sequence to be coded so as to improve video compression efficiency.

Frame Rate Up Conversion (FRUC) is a process of using video interpolation at the video decoder to increase the frame rate of the reconstructed video. In FRUC, interpolated frames are created using received frames as references. Currently, systems implementing FRUC frame interpolation include approaches based on motion compensated interpolation and the processing of transmitted motion vectors. FRUC is also used in converting between various video formats. For example, in Telecine and Inverse Telecine applications, which is a film-to-videotape transfer technique that rectifies the respective color frame rate differences between film and video, progressive video (24 frames/second) is converted to NTSC interlaced video (29.97 frames/second).

Another FRUC approach uses weighted-adaptive motion compensated interpolation (WAMCI), to reduce the block artifacts caused by the deficiencies of motion estimation and block based processing. This approach is based on an interpolation by the weighted sum of multiple motion compensated interpolation (MCI) images. The block artifacts on the block boundaries are also reduced in the proposed method by applying a technique similar to overlapped block motion compensation (OBMC). Specifically, to reduce blurring during the processing of overlapped areas, the method uses motion analysis to determine the type of block motion and applies OBMC adaptively. Experimental results indicate that the proposed approach achieves improved results, with significantly reduced block artifacts.

Yet another FRUC approach uses vector reliability analysis to reduce artifacts caused by the use of any motion vectors that are inaccurately transmitted from the encoder. In this approach, motion estimation is used to construct motion vectors that are compared to transmitted motion vectors so as to determine the most desired approach for frame interpretation. In conventional up-conversion algorithms using motion estimation, the estimation process is performed using two adjacent decoded frames to construct the motion vectors that will allow a frame to be interpolated. However, these algorithms attempt to improve utilization of transmission bandwidth without regard for the amount of calculation required for the motion estimation operation. In comparison, in up-conversion algorithms using transmitted motion vectors, the quality of the interpolated frames depends largely on the motion vectors that are derived by the encoder. Using a combination of the two approaches, the transmitted motion vectors are first analyzed to decide whether they are usable for constructing interpolation frames. The method used for interpolation is then adaptively selected from three methods: local motion-compensated interpolation, global motion-compensated interpolation and frame-repeated interpolation.

Although FRUC techniques are generally implemented as post-processing functions in the video decoder, thus the video encoder is typically not involved in this operation. However, in an approach referred to as encoder-assisted FRUC (EA-FRUC), the encoder can determine if transmission of certain information related to motion vectors or references frames (e.g., residual data), may be eliminated while still allowing the decoder to autonomously regenerate major portions of frames without the eliminated vector or residual data. For example, a bidirectional predictive video coding method has been introduced as an improvement to B-frame coding in MPEG-2. In this method, the use of an error criterion is proposed to enable the application of true motion vectors in motion-compensated predictive coding. The distortion measure is based on the sum of absolute differences (SAD), but this distortion measure is known to be insufficient in providing a true distortion measure, particularly where the amount of motion between two frames in a sequence needs to be quantified. Additionally, the variation in thresholds are classified using fixed thresholds when, optimally, these thresholds should be variable as the classifications are preferably content dependent.

The field-of-study of EA-FRUC is a growing field. With an increased interest in this area of video compression—particularly for low bit-rate applications like streaming video and video telephony, and especially in scenarios where the sender is at a network node, which is capable of supporting high complexity applications, and the receiver is a handheld with power and complexity constraints. EA-FRUC also finds application in open systems, where the decoder conforms to any standard or popular video coding technology, and in closed systems, where proprietary decoding techniques can be adopted.

What is desirable is an approach that provides high quality interpolated frames at the decoder while decreasing the amount of bandwidth needed to transmit the information needed to perform the interpolation and also decreasing the volume of calculation needed to create these frames so as to make it well suited to multimedia mobile devices that depend on low-power processing.

Accordingly, there is a need to overcome the issues noted above.

SUMMARY

The embodiments provides an Encoder Assisted Frame Rate Up Conversion (EA-FRUC) system that utilizes video coding and pre-processing operations at the video encoder to exploit the FRUC processing that will occur in the decoder in order to improve compression efficiency and reconstructed video quality.

In one embodiment, the process involves determining whether to encode a frame in a sequence of frames of a video content by determining a spatial activity in a frame of the sequence of frames; determining a temporal activity in the frame; determining a redundancy in at least one of the determined spatial activity, the determined temporal activity and the determined spatio-temporal activity; and, encoding the frame if the determined redundancy is below a predetermined threshold.

In another embodiment, the process involves determining whether to encode a set of one or more frames in a sequence of frames of a video content by determining spatial activity in the set of frames of the sequence of frames; determining temporal activity in the set of frames; determining a redundancy in at least one of the determined spatial activity, the determined temporal activity and the determined spatio-temporal activity; and, encoding one or more of the set of frames if the determined redundancies is within a set of predetermined thresholds.

In another embodiment, a computer readable medium having instructions stored thereon for causing a computer to execute a method for construction of a video sequence including a sequence of frames is disclosed. The method comprises determining a spatial activity in a frame of the sequence of frames; determining a temporal activity in the frame; determining a redundancy in at least one of the determined spatial activity and the determined temporal activity; and, encoding the frame if the determined redundancy is below a predetermined threshold.

In yet another embodiment, an apparatus for construction of a video sequence including a sequence of frames is disclosed. The apparatus includes means for determining a spatial activity in a frame of the sequence of frames; means for determining a temporal activity in the frame; means for determining a redundancy in at least one of the determined spatial activity and the determined temporal activity; and, means for encoding the frame if the determined redundancy is below a predetermined threshold.

In still yet another embodiment, at least one processor configured to implement a method for construction of a video sequence including a sequence of frames is disclosed. The method includes determining a spatial activity in a frame of the sequence of frames; determining a temporal activity in the frame; determining a redundancy in at least one of the determined spatial activity and the determined temporal activity; and, encoding the frame if the determined redundancy is below a predetermined threshold.

Other objects, features and advantages will become apparent to those skilled in the art from the following detailed description. It is to be understood, however, that the detailed description and specific examples, while indicating exemplary embodiments, are given by way of illustration and not limitation. Many changes and modifications within the following description may be made without departing from the spirit thereof, and the description should be understood to include all such modifications.

BRIEF DESCRIPTION OF THE DRAWINGS

The invention may be more readily understood by referring to the accompanying drawings in which.

Like numerals refer to like parts throughout the several views of the drawings.

DETAILED DESCRIPTION

Frame rate up conversion (FRUC) is a technique for increasing the frame rate at the decoder in low bit rate video transmission. Typically, this is a decoder operation. However, by anticipating the needs of the FRUC algorithm in the decoder, a video encoder can make intelligent decisions on which frame or frames in a video sequence can be dropped (i.e., not transmitted to the decoder) to offer an increase in the overall compressed bit rate—thus improving compression efficiency. In one embodiment of the encoder assisted-FRUC (EA-FRUC) system, as described herein, the encoder has access to the source frames as well as prior knowledge of the FRUC algorithm used on the decoder, and, using the interpolated frame generated therewith, transmits additional information to assist the decoder in performing FRUC and improve the decisions made during interpolation. Taking advantage of the knowledge that FRUC will be performed in the decoder, the EA-FRUC system utilizes video coding and pre-processing operations at the video encoder to improve compression efficiency (thereby improving utilization of transmission bandwidth) and reconstructed video quality. Specifically, information from the encoder that may be supplement or replace information normally transmitted by the encoder is provided to the decoder to be used in regular or encoder assisted FRUC.

In one embodiment, the information provided by the encoder includes such parameters as spatial (e.g., refinements, mode decisions, neighborhood characteristics) and temporal (e.g., motion vector(s) decisions) characteristics of the image to be interpolated at the decoder, as well as differential information with respect to normal predicted (B or P) frame coding and the interpolated frame generated by the FRUC process. The frames interpolated by the FRUC process will be referred to herein as "F-frames."

Encoder-Assisted FRUC Overview

Figure 1:
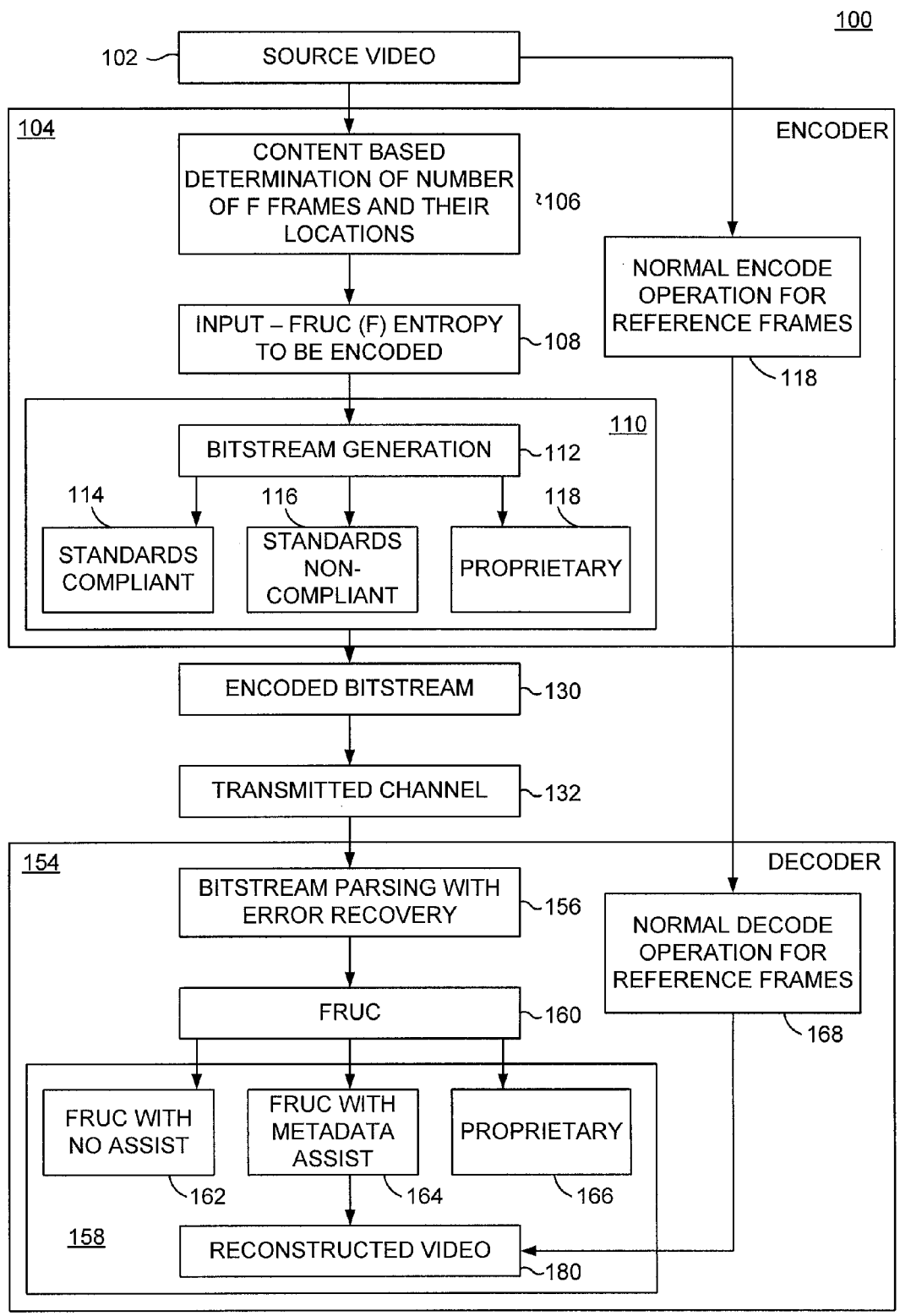
FIG. 1 is a block diagram of a video coding system implementing an encoder assisted frame rate up conversion (EA-FRUC) system in accordance with one embodiment.

FIG. 1 illustrates a video encoding/decoding ("coding") system 100 configured in accordance with one embodiment. The coding system 100 includes a video encoder 104 that processes digital video data so as to optimize that data for transmission and decoding by one or more decoders. Specifically, in one embodiment the video encoder 104 employs a video encoding algorithm to encode and compress an input source video 102 to reduce the bandwidth required to transmit the video 102 to decoder 154. The compression efficiency of the video encoder 104 can be improved through various methods, one of which is through transmitted frame rate reduction (i.e., reduction of the number of frames that has to be transmitted). FRUC mechanisms are then employed in decoder 154 to increase the frame rate of the decoded video stream and improve motion rendition. Specifically, decoder 154 creates interpolated frames using reference frames in the encoded video stream as received from encoder 104. As further described herein, the video encoder 104 is "aware" of the ability of the video decoder 154 to perform FRUC during encoding operation and exploits this potential to reduce the number and the size of frames transmitted.

Analysis of F Frames

In one embodiment, the encoder 104 of the coding system 100 includes a content classification module 106 to determine the spatial and temporal complexity both: (i) in each frame of the video sequence; and (ii) between the frames in the video sequence. The encoder 104 uses the result of this operation to determine: (i) which frames in a sequence of frames, also known as a Group of Pictures (GOP), can be dropped; and, (ii) how many consecutive frames can be dropped between two coded frames. Each GOP is, by definition, composed of an arrangement of one I picture (frame), P picture (frame), and one or more B pictures (frame). A GOP serves as a basic access unit, with the I frame serving as the access point to facilitate random access. It should be noted that a GOP can consist of variable number of frames. It is assumed that any dropped frames will be appropriately reconstructed as necessary using known FRUC techniques in the decoder 154. In one embodiment, one of the following methods may be adopted for the analysis:

1. Rank the importance of each frame in the sequence depending on the activity in the sequence (e.g., slow motion versus high motion, flat regions versus busy textures), and then drop (discard) all highly correlated frames in the sequence.

2. The FRUC algorithm available at the decoder 154 is employed at the encoder 104 to construct an expected FRUC frame. If the correlation between a source frame and its interpolated version is high, the source frame is dropped. Alternatively, if the source frame is encoded as a B-frame and the reconstructed B-frame is highly correlated to its interpolated version, this highly correlated B-frame is dropped. If not, the source frame is encoded and transmitted. If the correlation between the source frame and the interpolated frame or the B-frame and the interpolated frame is moderate, the non-redundant part of the frame is coded as assist information that is used to improve the quality of the interpolated frame with respect to its corresponding source frame.

Figure 2:
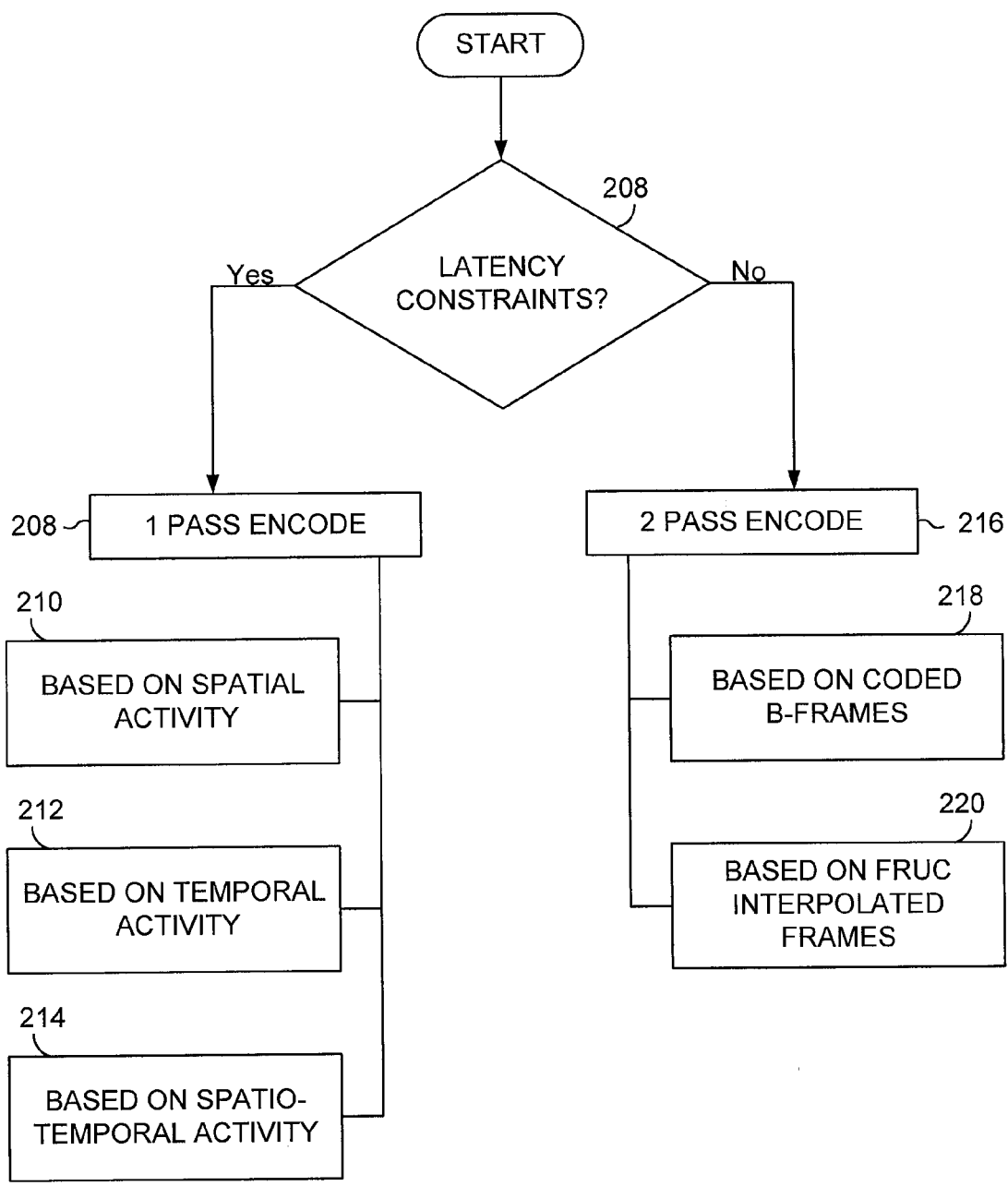
FIG. 2 is a flow diagram illustrating the operation of the EA-FRUC system of FIG. 1.

FIG. 2 illustrates one embodiment of the process used by coding system 100 to classify the source content. In one embodiment, in step 208 it is determined whether any latency constraints exist for the performance of the encoding of the source content. For example, real-time streaming applications or encoders constrained by latency requirements (e.g., streams carrying conversational video such as video telephony) typically have to complete all encoding operations in a single pass. In this case, operation continues with step 208, where a one-pass encoding process is performed. In contrast, non-conversational video, such as video on demand (VOD), digital camera and camcorder applications where encoded video is stored and thus no constraints are placed on the encoding operation in terms of timing resources, may be processed using two-pass encoding, as in step 216. As described herein, because of these differences, the extent and quality of content classification performed by coding systems 100 for the two modes vary.

Spatial Activity

Continuing to refer to FIG. 2 and referring back to FIG. 1, spatial activity is determined by content classification module 106 in step 210. Specifically, content classification module 106 determines the amount of spatial activity in the video source 102. In one embodiment, spatial activity refers to the amount of texture information, such as edge, saturated color, and high contrast objects, in the image frames of a video sequence. Generally, the greater the amount of texture information in the video sequence, the greater the spatial activity. In one embodiment, texture information can be quantified using the following measures:

a. Mean: In block-based encoding, the mean of each block as compared to the mean of: (i) the frame or (ii) a neighborhood of blocks of varying sizes.

b. Variance: The amount of pixel variance in each macroblock can be compared against a pre-determined data-dependent threshold to determine spatial activity. Alternatively, blocks may be classified based on the variance and the mean measures, in which case different thresholds can be used for different ranges of mean values.

c. Variable Block Size/Shape Mean and Variance: The mean and variance measures can be extended to variable block sizes and to objects spanning arbitrarily sized (and shaped) regions in an image or frame.

d. Contrast Ratio: The ratio of: (i) the standard deviation of a block, region, or object, to (ii) the mean of a region or neighborhood of blocks (e.g., a 3.times.3 block), may be used to provide a measure of contrast within a neighborhood of elements. Additionally contrast-ratio can be weighted based on the mean values Specifically, the contrast ratio of a given block or macroblock is expressed as a sum of differences of the mean of the current block and the mean of neighboring blocks (8 neighboring blocks in a 3.times.3 neighborhood of 9 blocks) normalized by the mean of all the blocks in the neighborhood. This measure provided significant granularity into spatial texture information, which translates to spatial activity and was successfully used as the block partitioning algorithm, for variable block size DCT (also known as ABSDCT).

e. Motion Vector Field: In predicted frames (e.g., P or B frames), the motion vectors of macroblocks (and motion vectors of subblocks) of the predicted frame may be mapped to form a motion vector field. Such fields are used for motion vector processing to smooth outlier motion vectors and, in general, are indicators of: (i) the overall motion in the sequence; (ii) the motion activity of various objects in the frames (e.g., based on the intensity, density and/or magnitude of the motion vector field); and, (iii) the number of moving objects in the frame. The level of motion activity also provides an indication of spatial activity of a particular sequence due to the need for the detection by the motion activity process to detect both objects (which requires the detection of edges) and variability (which requires the detection of differences between regions) across the sequence.

f. Edge Detection: Edge detection algorithms in image processing typically apply a high pass filter, such as a Sobel filter, to the pixels in an image over a particular window (e.g., a 3.times.3 or 5.times.5 region), and then the filtered output is compared to a threshold to determine the existence of an edge. A map of the detected edges and the amount of edges provides an indication of spatial activity.

g. There are various other indicators of spatial activity as known to those familiar with the art of image processing, and any such measure can be applied to the process as shown in FIG. 2.

Temporal Activity

In step 212, temporal activity is determined by content classification module 106. The amount of motion in a video sequence determines the amount of temporal correlation and redundancy in the frames of the video sequence that can be used to compress the video sequence. In one embodiment, the quantification of temporal activity is determined via one of the following approaches:

a. Motion Vector Field: This measure uses the same approach as described above under the description for the spatial activity module 210 to construct a motion vector field for an interpolated frame and then analyze the motion vector field.

b. Predicted Frame Size: The size of a predicted frame is an indicator of its entropy because, for a predicted frame, the predicted frame size depends on the number of bits required to code the motion vectors and residuals from the prediction. Generally, the greater the amount of motion (or temporal activity), the greater the entropy to be coded in the predicted frames.

c. MPEG-7 Descriptor: The MPEG-7 motion activity descriptor (MAD) attempts to "capture" human perception of the "intensity of action" or the "pace" of a video sequence. For instance, a goal scoring moment in a soccer game would be perceived as a "high action" sequence by most human viewers. In comparison, a "head and shoulders" sequence of a talking person would certainly be considered a "low action" sequence by the same viewers. The MPEG-7 MAD has been found to accurately capture the entire range of intensity of action in natural video. It uses a quantized standard deviation of motion vectors to classify video segments into five classes ranging from very low to very high intensity.

d. Motion Activity: The motion activity descriptor addresses the issue of efficient content analysis, indexing, browsing, and querying of video data motion activity, which is defined as the amount of motion in a video sequence, and has been included as a descriptor in the MPEG-7 standard. The proposed technique attempts to automatically measure motion activity using the accumulation of quantized pixel differences among the frames of a given video segment. As a result, the accumulated motion of each scene are represented as a two dimensional matrix. A scalable technique to compare these matrices and generate MADs that represent various motions of each scene effectively is also provided. The degrees (amounts) as well as the locations of motion are computed and presented.

All the above spatial and temporal activity measures are just examples. In other embodiments, any and all such algorithms can be used with simple thresholding to assess and grade the level of spatial and temporal activity in a frame and between frames.

Spatio-Temporal Activity:

In step 214, absolute spatial activity between neighboring frames or a set of frames such as a GOP and the variation (variance) of the absolute spatial activity across frames are quantified using simple frame differences and/or higher order statistics such as variance and kurtosis to determine the correlation between frames.

Alternatively, the principles of contrast ratio is extended to the temporal domain to provide spatio-temporal activity measures.

Determination of Redundancy

The spatial activity metrics determined by step 210 in conjunction with the temporal or motion activity metrics determined by step 212 are used to determine the overall spatial temporal activity for a given sequence. For example, in hybrid video compression the first frame in a sequence (e.g., the first frame after a random access point or a scene change) is encoded—typically independently of any temporal prediction. This first frame is referred to as an I frame. Subsequent frames in the sequence are predominantly predicted from the I or other previous frame(s), which, as previously noted, are referred to as P or B frames. In one embodiment, redundancy between the reference frame and the predicted frame in the video source sequence may be determined using the below approaches:

a. Correlation: A two element correlation of: (1) the pixels of (i) one or more macro blocks; (ii) other basic units of a frame; or (iii) an entire predicted frame, with respect to (2) an equivalent collocated unit in the reference frame, may be performed to determine redundancy. This processing approach is a computationally expensive operation, but is an accurate estimate of redundancy.

b. Motion Vector: The magnitude and correlation of motion vectors, both in a neighborhood of macro blocks and over an entire frame, is compared between the reference and predicted frames. Motion vector smoothing or other motion vector processing may then be applied to determine motion vector variance, or to classify motion fields based on activity.

c. Importance: each macroblock or window of macroblocks is then rated based on the level of redundancy as low, medium or high. Low redundancy blocks are coded as B-frames using bi-directional prediction, medium redundancy blocks provide one or more of the following information to the decoder: motion vector to refine the motion vector processing results in the decoder FRUC, residue information to refine the difference in texture, luminance shift information in the form of DC offsets etc. High redundancy blocks are those that correlate well with the corresponding blocks in the FRUC interpolated frame and are skipped.

All of the above described pieces of information regarding a macroblock or window, 3.times.3, of macroblocks is referred to as assist information.

Choice of Frames for FRUC

After the amount of redundancy in the source video has been determined as described above, it is then classified based on content. In one embodiment, a variety of sample source data is utilized to establish the classification parameters for a particular application, and thus coding system 100 can be tuned to the specific content expected to be supported by that implementation. The classification mechanism uses the size of the predicted frames in normal hybrid coding. In one embodiment, the smaller the size and greater the redundancy factor of the predicted frame, the higher the probability that the interpolated frame will be skipped during the encoding process. These frames will thus not be included in the transmittal video sequence but, consequently, will be up-converted during decoding/FRUC process.

Figure 3:
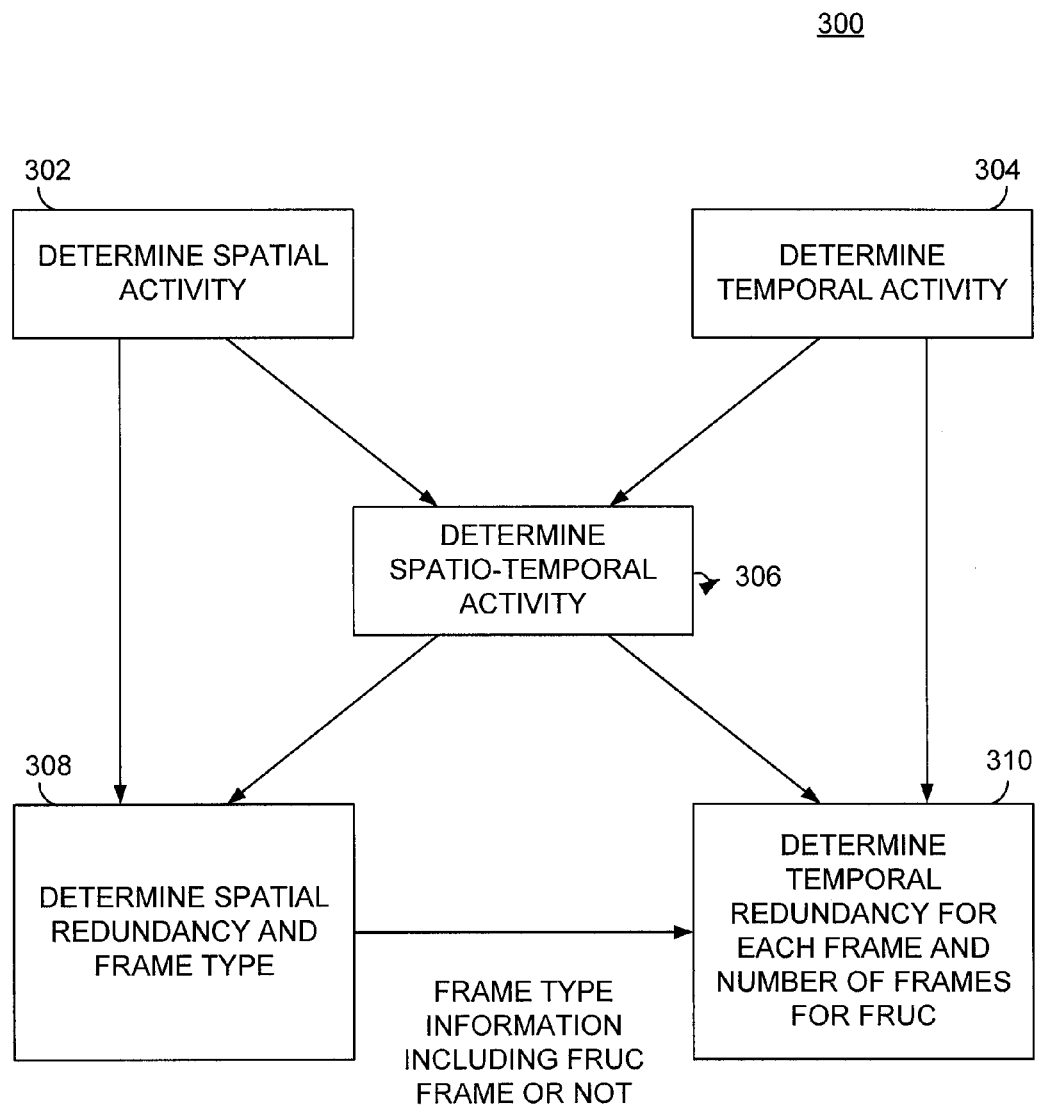
FIG. 3 is a diagram illustrating a one-pass encoding in accordance with one embodiment of the EA-FRUC system of FIG. 1.
Figure 4:
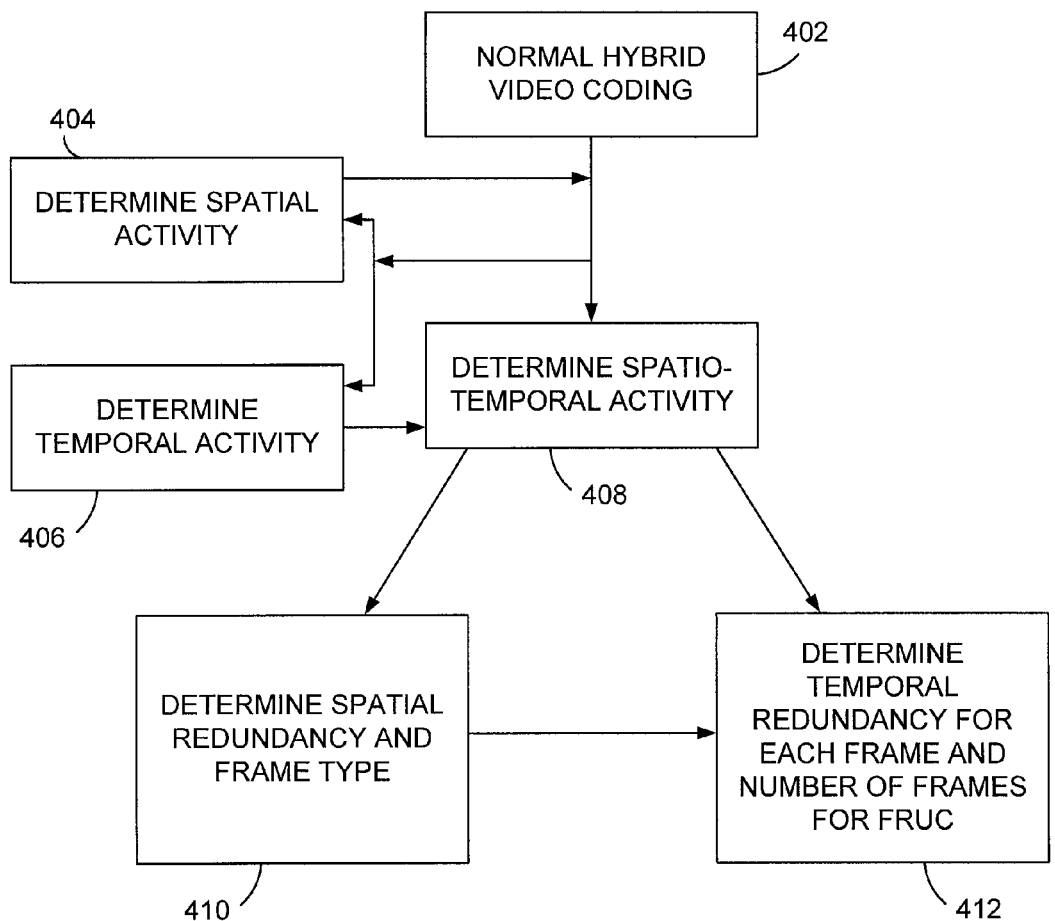
FIG. 4 is a diagram illustrating a two-pass encoding in accordance with one embodiment of the EA-FRUC system of FIG. 1; and, FIG. 5 is a block diagram illustrating an application of EA-FRUC system 100 to a wireless system.

The above described mechanism applies to one-pass and low complexity two-pass encoding, as shown in FIG. 3, that are useful for such applications as mobile camcorder applications; where latency and processor capabilities limit the ability of the device to perform a complete or partial first pass encoding followed by complete second pass encoding. However, when encoder complexity is not of concern, as in an interne or wireless multimedia server implementations, normal hybrid encoding can be carried out in the first pass and then spatial activity, temporal activity, spatio-temporal activity may be determined in a second pass, as illustrated in FIG. 4. In one embodiment, based on the predicted frame sizes of the video sequence (e.g., the frame sizes of P and B frames in the video sequence) and frame characteristics (e.g., proportion of bits for Motion Vectors versus coefficient data), low cost (e.g., low transmission cost frames) can be dropped at the encoder 104 and reconstructed at the decoder 154 using decoded reference frames. In another embodiment, a small entropy can be encoded by the encoder 104 and transmitted to the decoder 154 to "assist" the decoder 154 with the up-conversion process, as described below. Although the purpose of the assistance is primarily to enhance the quality of reconstructed video, it can also be used to reduce the computational load on the decoder 154 by aiding the FRUC engine 158 at the decoder 154 in making the right decisions during a mode decision process.

Coding of Entropy Between Source and FRUC Interpolated Frames

As noted herein, one of the primary advantages of EA-FRUC is that the source frame for the frame to be interpolated is available at the encoder. Hence, FRUC decisions can be guided to minimize the error between the source and the reconstructed frame. For example, the proposed FRUC processing approaches described herein depend on motion vector processing, content identification and assignment. In these processes, interpolation of occlusions and overlapping regions is a challenge. However, using entropy coding by a entropy determination module 108 in FIG. 1, such regions are identified and appropriate side information is transmitted to the decoder 154 to assist with the FRUC process. Other applications of such entropy coding are in scalable video coding applications of FRUC processes, as described in co-pending patent application Ser. No. 11/173,121, entitled "Method and Apparatus for Using Frame Rate up Conversion Techniques in Scalable Video Coding." In one embodiment, entropy determination module 108 may use the following measures for entropy coding:

1. Pixel Difference Data: The pixel residue between a reconstructed FRUC frame and a source frame is transformed, quantized and entropy coded for transmission. This approach is simple. However, any remaining residue from the encoding process contains high energy and does not compress well.

2. Thresholding: Thresholds are based on activity (spatial and temporal) measures, or human visual system masking and sensitivity instead of being based on SAD. Human visual system (HVS) is an empirical model that describes the sensitivities of human eye to various visual effects such as color, luminance, contrast, etc., SAD is known to minimize error from a mean squared sense rather than a visual quality sense.

3. Motion Vector: Correct motion vector data for regions with large differences from the source frame are coded and transmitted. This motion vector is estimated using the source frames and reconstructed reference frames, in both a causal and non-causal fashion. Causal coding is predictive coding that utilizes the information available at the moment of coding/decoding (e.g., information from previous macroblocks in term of decoding order), whereas non-causal coding is interpolative coding that utilizes interpolative information (e.g., information from the next macroblock).

4. B-frame Encoding: In co-pending patent application Ser. No. 11/173,121 entitled "Method and Apparatus for Using Frame Rate up Conversion Technique in Scalable Video Coding," the use of a FRUC-interpolated frame as one of the reference frames during Bframe prediction is described. This approach can offer, on average, a 30% reduction in the texture data to be transmitted.

5. Mode Based: The B-frame encoding approach, above, describes the use of an interpolated frame as a reference frame in encoding B-frames. The decision to use the interpolated frame can be based on rate (i.e., to minimize the bit rate for a given distortion), distortion (i.e., to minimize distortion for a given target bit rate), and/or quality (i.e., maximize HVS-based or mean squared error, a metric to measure perceptual quality-based quality measures for given target bit rate).

Once the entropy to be encoded has been determined, in one embodiment commonly used variable length codes like Huffman or arithmetic codes can be applied to encode the data. Further, for Laplacian distributed data such as residuals, Golomb-Rice or Exp-Golomb codes can be applied.

Bitstream Generation

Video coding standards define the bitstream to be decoded by any standards conformant video decoder. However, the encoder operation is "open" in the sense that any encoder technique may be used so long as the encoded bitstream is compatible with a standards-compliant decoder in the reconstruction process. In open-ended applications, where the decoder capabilities are unknown, a standard-compliant bitstream needs to be generated by the encoder and performance is targeted and optimized for compliant decoding. In one embodiment, a bitstream generation module 112 of the coding system 100 controls the operation of a standards-compliant bitstream generator 114, a standards non-compliant bitstream generator 116, and a proprietary bitstream generator 118. The operation of each of these generators will be explained below.

Profiles and levels are defined in video coding standards because they offer a large set of tools for the coding of audio-visual objects and, in order to allow effective implementations of standards, subsets of the tool sets have been identified, to be used for specific applications. These subsets, called 'Profiles,' limit the number of tools in a tool set a decoder has to implement. Further, for each of these Profiles, one or more levels of complexity are also set, restricting the computational complexity.

Standards and Profile Compliant

In order for standard-compliant decoders in receivers to decode a transmitted stream, as in wireless multimedia communications, these video decoders conform to specific profiles and levels. Although FRUC algorithms have been provided in various standards as annexes, they are typically not part of a standard profile. Thus, it is desirable that no modification to the bitstream syntax and/or semantics would have to be made to accommodate EA-FRUC.

In order to conform to existing standards, the coding system 100 uses the standards-compliant syntax (profile compliant) can be exploited to transmit the "assist" information. In one embodiment, the standard syntax may be used by the standards-compliant generator 114 in the following approaches to implement the EA-FRUC process:

a. B-frame Syntax: When B-frames are not received, either because they are part of the enhancement layer and only the base layer was received, or, the entire B-frame is not sent, with most of the redundant macro blocks being skip mode macro blocks, only the assist information is sent through the normal B-frame coding.

b. Redundant Slices or Pictures: H.264 provides for this syntax. An entire slice or frame need not be sent in this case where certain of the frames are redundant. Parts of slice (few important macro blocks) or frame (few slices determined to be important) are sent using this syntax. This feature is part of all profiles defined in H.264.

c. Supplemental Enhancement Information (SEI): Specific fields of SEI are part of the profiles in H.264 that can be used to transmit "assist" information.

Standards Compliant, Profile Non-Compliant

The tool sets in many video coding standards include syntax and semantics to carry private data that are non-compliant to the profiles defined in the standard (i.e., tools provide for informative as opposed to normative references). The interpretation of the parsed private data can be specific to destination devices, which in a closed communication system this particular feature can be exploited to improve performance. In one embodiment of the invention, the standard non-compliant bitstream generator 116 utilizes these standard non-compliant private data to provide the "assist" information for FRUC in one such application of this feature. The use of private information in a closed loop system provides more flexibility in the transmission of "assist" information as the decoder modifications needed to exploit them are minimal and can be enabled through simple "plug-ins" or "add-ons":

a. Specific Fields of SEI: These fields, which are not part of the profiles in H.264, can be used to transmit "assist" information.

b. User Data: MPEG-2 and MPEG-4 offer syntax to carry private data, which can be used to transmit the "assist" information.

Proprietary

A standards non-conformant proprietary codec provided in proprietary bitstream generator 118 increases the flexibility of the EA-FRUC approach provided herein. Specifically, any and all video compression technologies (e.g., based on transforms such as DCT, integer, Hadamard, wavelet, object, optical flow, or morphing) can adopt the generic algorithm of video interpolation applied to achieve bit rate reduction and increase compression efficiency as described above for EA-FRUC. The advantages of using a proprietary codec include the fact that the proprietary nature of the bitstream generator 118 provides an extremely flexible platform to exploit all FRUC and EA-FRUC algorithms. Great reduction in bitstream overhead, introduced by standards (e.g., Macroblock headers in H.264 tends to occupy 25% of total bit rate), may be reduced and/or eliminated. Joint source-channel coding is also possible now, which is highly advantageous for multimedia communications over error prone channels. For example, a proprietary approach that utilizes joint source and transmission channel probabilities, distributions and characteristics provides the ability for coding system 100 to prioritize a particular stream and add needed parameters and data to recover from errors gracefully.

FRUC and EA-FRUC for Error Concealment

The gaining popularity of wireless multimedia requires the transmitted video to be resilient to errors and smart video decoders that can conceal bit, packet and burst errors. Video compression removes redundancy and increases entropy in compressed stream. Ironically, however, the removal of redundant information and increase in entropy is so significant—almost to the extent that the loss of a single bit, byte or packet of data can impact reconstructed video quality; ranging from the loss of one block to many macroblocks or slices, propagating through the current GOP until the next I or Instantaneous Decoding Refresh (IDR) frame is received correctly. IDR is a H.264 terminology that stands for Instantaneous Decoding Refresh. An IDR picture is an absolute refresh point (access unit) in the bitstream such that there is no predictive information beyond the access unit needed for decoding an IDR picture. The possibilities of errors occurring has serious consequences and error concealment is vital in such applications as video telephony, video conferring, and video email). Errors also impact latencies in conversation applications. Fortunately, frame, slice, macroblock and block interpolation and interpolation-assist algorithms (e.g., motion vector assignment and motion vector processing) as provided in various forms FRUC may be used for error concealment.

Figure 5:
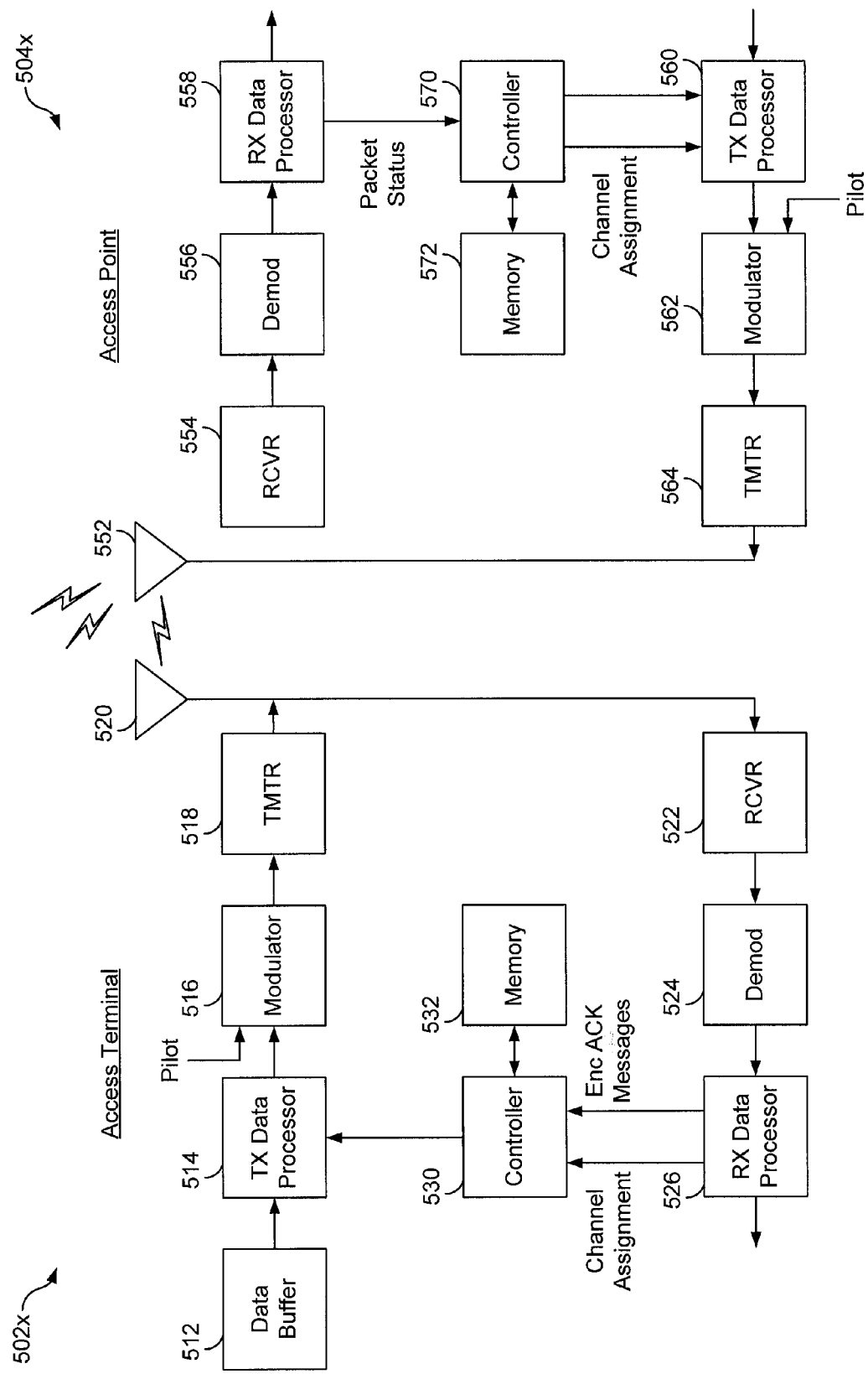

FIG. 5 shows a block diagram of an access terminal 502x and an access point 504x, in which decoder 154 and encoder 104 may be respectively located in an application of EA-FRUC system 100 to a wireless system. For the reverse link, at access terminal 502x, a transmit (TX) data processor 514 receives traffic data from a data buffer 512, processes (e.g., encodes, interleaves, and symbol maps) each data packet based on a selected coding and modulation scheme, and provides data symbols. A data symbol is a modulation symbol for data, and a pilot symbol is a modulation symbol for pilot (which is known a priori). A modulator 516 receives the data symbols, pilot symbols, and possibly signaling for the reverse link, performs (e.g., OFDM) modulation and/or other processing as specified by the system, and provides a stream of output chips. A transmitter unit (TMTR) 518 processes (e.g., converts to analog, filters, amplifies, and frequency upconverts) the output chip stream and generates a modulated signal, which is transmitted from an antenna 520.

At access point 504x, the modulated signals transmitted by access terminal 502x and other terminals in communication with access point 504x are received by an antenna 552. A receiver unit (RCVR) 554 processes (e.g., conditions and digitizes) the received signal from antenna 552 and provides received samples. A demodulator (Demod) 556 processes (e.g., demodulates and detects) the received samples and provides detected data symbols, which are noisy estimate of the data symbols transmitted by the terminals to access point 504x. A receive (RX) data processor 558 processes (e.g., symbol demaps, deinterleaves, and decodes) the detected data symbols for each terminal and provides decoded data for that terminal.

For the forward link, at access point 504x, traffic data is processed by a TX data processor 560 to generate data symbols. A modulator 562 receives the data symbols, pilot symbols, and signaling for the forward link, performs (e.g., OFDM) modulation and/or other pertinent processing, and provides an output chip stream, which is further conditioned by a transmitter unit 564 and transmitted from antenna 552. The forward link signaling may include power control commands generated by a controller 570 for all terminals transmitting on the reverse link to access point 504x. At access terminal 502x, the modulated signal transmitted by access point 504x is received by antenna 520, conditioned and digitized by a receiver unit 522, and processed by a demodulator 524 to obtain detected data symbols. An RX data processor 1026 processes the detected data symbols and provides decoded data for the terminal and the forward link signaling. Controller 530 receives the power control commands, and controls data transmission and transmit power on the reverse link to access point 504x. Controllers 530 and 570 direct the operation of access terminal 502x and access point 504x, respectively. Memory units 532 and 572 store program codes and data used by controllers 530 and 570, respectively.

An "access terminal," as discussed herein, refers to a device providing voice and/or data connectivity to a user. The access terminal may be connected to a computing device such as a laptop computer or desktop computer, or it may be a self contained device such as a personal digital assistant. The access terminal can also be referred to as a subscriber unit, mobile station, mobile, remote station, remote terminal, user terminal, user agent, or user equipment. The access terminal may be a subscriber station, wireless device, cellular telephone, PCS telephone, a cordless telephone, a Session Initiation Protocol (SIP) phone, a wireless local loop (WLL) station, a personal digital assistant (PDA), a handheld device having wireless connection capability, or other processing device connected to a wireless modem.

An "access point," as discussed herein, refers to a device in an access network that communicates over the air-interface, through one or more sectors, with the access terminals. The access point acts as a router between the access terminal and the rest of the access network, which may include an IP network, by converting received air-interface frames to IP packets. The access point also coordinates the management of attributes for the air interface.

The disclosed embodiments may be applied to any one or combinations of the following technologies: Code Division Multiple Access (CDMA) systems, Multiple-Carrier CDMA (MC-CDMA), Wideband CDMA (W-CDMA), High-Speed Downlink Packet Access (HSDPA), Time Division Multiple Access (TDMA) systems, Frequency Division Multiple Access (FDMA) systems, and Orthogonal Frequency Division Multiple Access (OFDMA) systems.

It should be noted that the methods described herein may be implemented on a variety of communication hardware, processors and systems known by one of ordinary skill in the art. For example, the general requirement for the client to operate as described herein is that the client has a display to display content and information, a processor to control the operation of the client and a memory for storing data and programs related to the operation of the client. In one embodiment, the client is a cellular phone. In another embodiment, the client is a handheld computer having communications capabilities. In yet another embodiment, the client is a personal computer having communications capabilities.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium is coupled to the processor, such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The description of the disclosed embodiments is provided to enable any person skilled in the art to make or use the various embodiments. Various modifications to these embodiments may be readily apparent to those skilled in the art, and the generic principles defined herein may be applied to other embodiments, e.g., in an instant messaging service or any general wireless data communication applications, without departing from the spirit or scope of the invention. Thus, the description is not intended to be limited to the embodiments shown herein but is to be accorded the widest scope consistent with the principles and novel features disclosed herein. The word "exemplary" is used exclusively herein to mean "serving as an example, instance, or illustration." Any embodiment described herein as "exemplary" is not necessarily to be construed as preferred or advantageous over other embodiments.

What is claimed is:

1. A method for processing a video bitstream, the method comprising:
   using an entropy coding technique to code differential information in the video bitstream selected from a group consisting of a variable length coding technique, a Huffman coding technique, and an arithmetic coding technique, wherein the differential information comprises differential information with respect to a predicted frame coding and an interpolated frame generated by a frame rate up conversion process; and
   conveying the coded information in a user data syntax specified in a video coding standard.

2. The method of claim 1, further comprising:
   generating a standards compliant video bitstream which includes the coded information.

3. The method of claim 1, further comprising:
   using the differential information of the coded information to assist a decoder with frame rate up conversion process.

4. The method of claim 3, wherein the decoder assistance provided by the differential information of the coded information is to enhance a quality of reconstructed video.

5. The method of claim 3, wherein the decoder assistance provided by the differential information of the coded information is to reduce a computational load on the decoder.

6. The method of claim 5, wherein the computational load on the decoder is reduced by the coded information aiding a frame rate up conversion engine of the decoder in making decisions during a mode decision process.

7. The method of claim 1, further comprising:
determining the differential information between two frames by determining a difference measure selected from a group consisting of a pixel differences measure, a motion information differences measure, a mode decision threshold measure and an interpolated frame refinement measure, wherein the determination of the difference measure is performed using a frame rate up conversion process.

8. The method of claim 1, wherein the entropy coding process is specified in a video coding standard, and wherein a standards-compliant processor is able to process the differential information in conjunction with a frame rate up conversion process to generate a video frame.

9. The method of claim 1, further comprising:
processing the video bitstream with differential information encoded therein by extracting the coded differential information from the user data syntax, decoding the differential information, and generating a video frame using the decoded differential information in a frame rate up conversion process.

10. A non-transitory tangible computer readable medium having instructions stored thereon for causing a computer to execute a method for processing a video bitstream, the video bitstream having differential information contained therein, the method comprising:
using an entropy coding technique to code differential information in the video bitstream selected from a group consisting of a variable length coding technique, a Huffman coding technique, and an arithmetic coding technique, wherein the differential information comprises differential information with respect to a predicted frame coding and an interpolated frame generated by a frame rate up conversion process; and
conveying the coded information in a user data syntax specified in a video coding standard.

11. The computer readable medium of claim 10, further comprising:
generating a standards compliant video bitstream.

12. The computer readable medium of claim 10, further comprising:
using the differential information of the coded information to assist a decoder with the frame rate up conversion process.

13. The computer readable medium of claim 12, wherein the decoder assistance provided by the differential information of the coded information is to enhance a quality of reconstructed video.

14. The computer readable medium of claim 12, wherein the decoder assistance provided by the differential information of the coded information is to reduce a computational load on the decoder.

15. The computer readable medium of claim 14, wherein the computational load on the decoder is reduced by the coded information aiding a frame rate up conversion engine of the decoder in making decisions during a mode decision process.

16. The computer readable medium of claim 10, further comprising:
determining the differential information between two frames by determining a difference measure selected from a group consisting of a pixel differences measure, a motion information differences measure, a mode decision threshold measure and an interpolated frame refinement measure, wherein the determination of the difference measure is performed using a frame rate up conversion process.

17. The computer readable medium of claim 10, wherein the entropy coding process is specified in a video coding standard, and wherein a standards-compliant processor is able to process the differential information in conjunction with a frame rate up conversion process to generate a video frame.

18. The computer readable medium of claim 10, further comprising:
processing the video bitstream with differential information encoded therein by extracting the coded differential information from the user data syntax, decoding the differential information, and generating a video frame using the decoded differential information in a frame rate up conversion process.

19. An apparatus for processing a video bitstream, the video bitstream having differential information contained therein, the apparatus comprising:
means for entropy coding differential information in the video bitstream with a coding technique selected from a group consisting of a variable length coding technique, a Huffman coding technique, and an arithmetic coding technique, wherein the differential information comprises differential information with respect to a predicted frame coding and an interpolated frame generated by a frame rate up conversion process; and
means for conveying the coded information in a user data syntax specified in a video coding standard.

20. The apparatus of claim 19, further comprising:
means for generating a standards compliant video bitstream.

21. The apparatus of claim 19, further comprising:
means for using the differential information of the coded information to assist a decoder with frame rate up conversion process.

22. The apparatus of claim 21, wherein the decoder assistance provided by the differential information of the coded information is to enhance a quality of reconstructed video.

23. The apparatus of claim 21, wherein the decoder assistance provided by the differential information of the coded information is to reduce a computational load on the decoder.

24. The apparatus of claim 23, wherein the computational load on the decoder is reduced by the coded information aiding a frame rate up conversion engine of the decoder in making decisions during a mode decision process.

25. The apparatus of claim 19, further comprising:
means for determining the differential information between two frames by determining a difference measure selected from a group consisting of a pixel differences measure, a motion information differences measure, a mode decision threshold measure and an interpolated frame refinement measure, wherein the determination of the difference measure is performed using a frame rate up conversion process.

26. The apparatus of claim 19, wherein the entropy coding process is specified in a video coding standard, and wherein a standards-compliant processor is able to process the differential information in conjunction with a frame rate up conversion process to generate a video frame.

27. The apparatus of claim 19, further comprising:
means for processing the video bitstream with differential information encoded therein by extracting the coded differential information from the user data syntax, decoding the differential information, and generating a video frame using the decoded differential information in a frame rate up conversion process.

* * * * *